United States Patent

[11] 3,587,691

| [72] | Inventors | Earl L. Brassington;<br>James L. Balch, both of Madison, Wis.;<br>Harry V. Hornagold, Urbandale, Iowa |
|---|---|---|
| [21] | Appl. No. | 774,619 |
| [22] | Filed | Nov. 12, 1968 |
| [45] | Patented | June 28, 1971 |
| [73] | Assignee | Oscar Mayer & Co., Inc.<br>Chicago, Ill. |

[54] MACHINE FOR SKINNING BACON BELLIES
1 Claim, 8 Drawing Figs.

[52] U.S. Cl. .................................................. 146/130
[51] Int. Cl. ................................................ A22c 17/12
[50] Field of Search .......................................... 146/130

[56] References Cited
UNITED STATES PATENTS

| 2,649,881 | 8/1953 | Runnells, Jr. et al. | 146/130 |
| 2,654,122 | 10/1953 | Derby | (146/130UX) |
| 2,659,402 | 11/1953 | Townsend | 146/130 |
| 3,280,869 | 10/1966 | Harrington et al. | 146/130 |
| 3,340,916 | 9/1967 | Burch | 146/130 |

*Primary Examiner*—Willie G. Abercrombie
*Attorney*—Greist, Lockwood, Greenawalt and Dewey ABSTRACT: The bacon skinning machine comprises a knife blade mounted in the machine and heating means associated with the knife blade for heating the knife blade and means for maintaining the temperature of the knife blade within a predetermined range for melting the fat whereby the skin is separated from the bacon belly by a combined cutting and melting action as distinguished from either action alone. Preferably, the knife blade is retained in a pressure shoe and means are provided for accurately adjusting the distance which the cutting edge of the blade extends from the pressure shoe.

PATENTED JUN28 1971 3,587,691
SHEET 1 OF 3
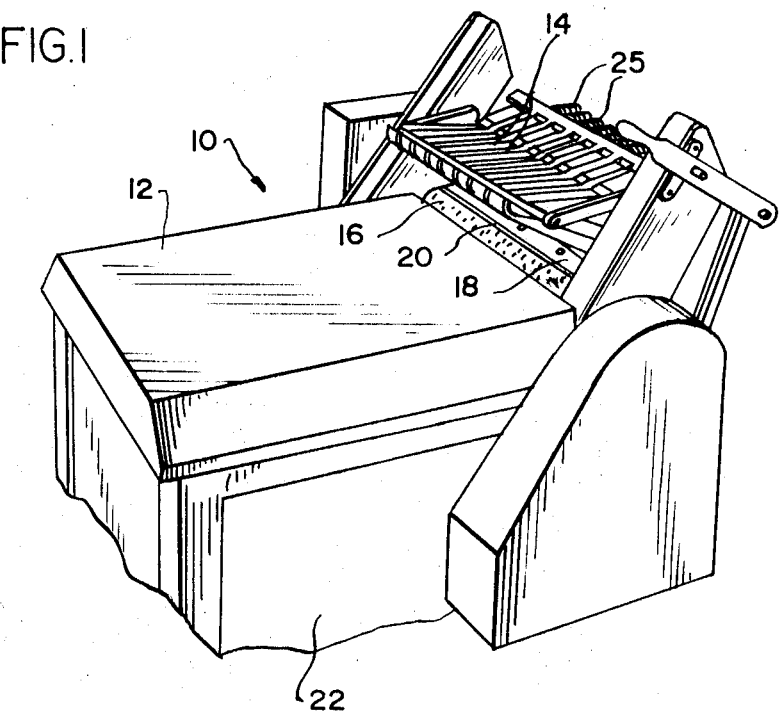
FIG.1
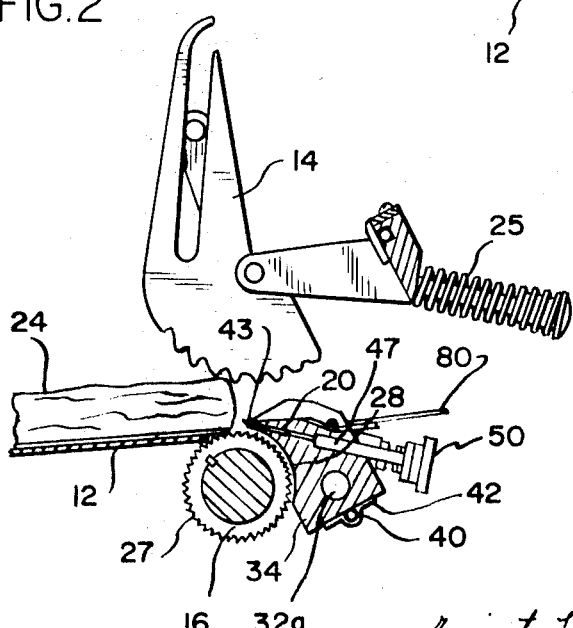
FIG.2
FIG.3
INVENTORS.
EARL L. BRASSINGTON
JAMES L. BALCH
HARRY V. HORNAGOLD
BY *Grist, Lockwood, Greenawalt & Dewey*
ATTORNEYS.

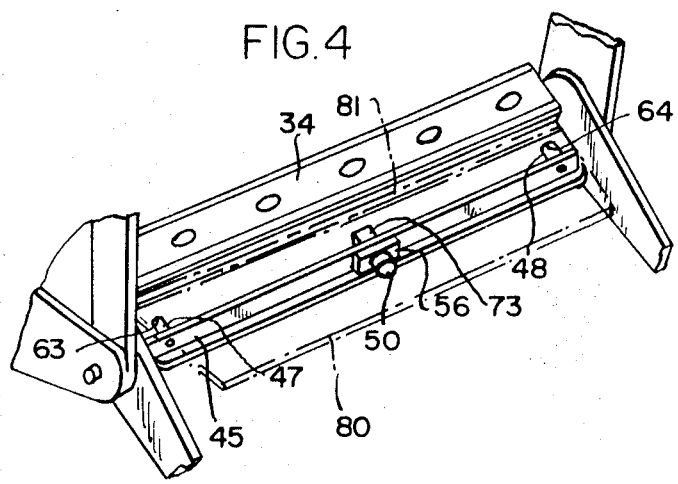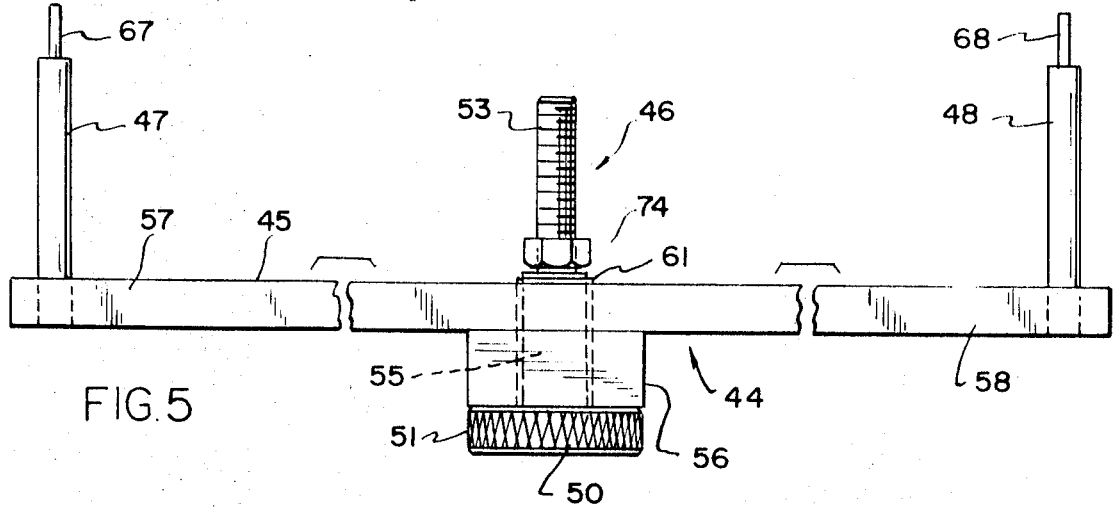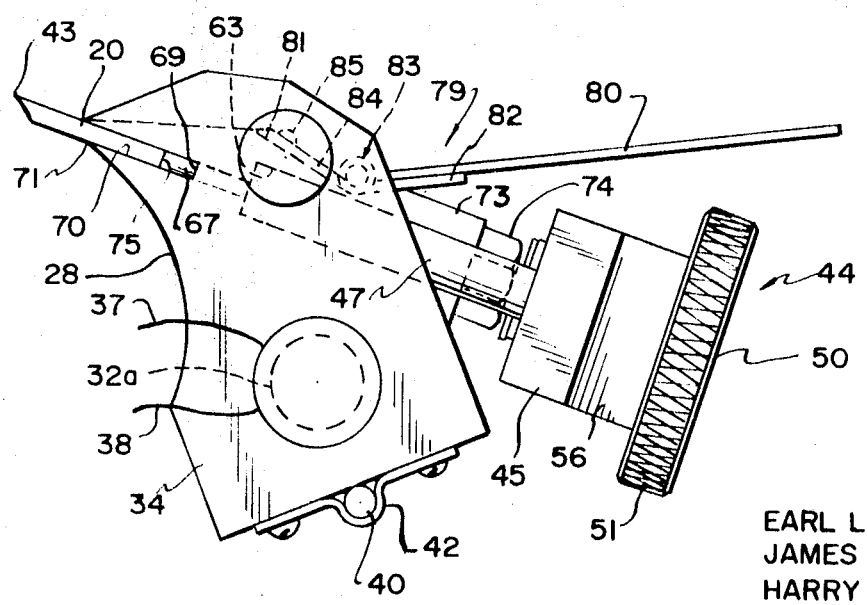
INVENTORS.
EARL L. BRASSINGTON
JAMES L. BALCH
HARRY V. HORNAGOLD
BY *Dreist, Lockwood, Greenawalt & Dewey*
ATTORNEYS.

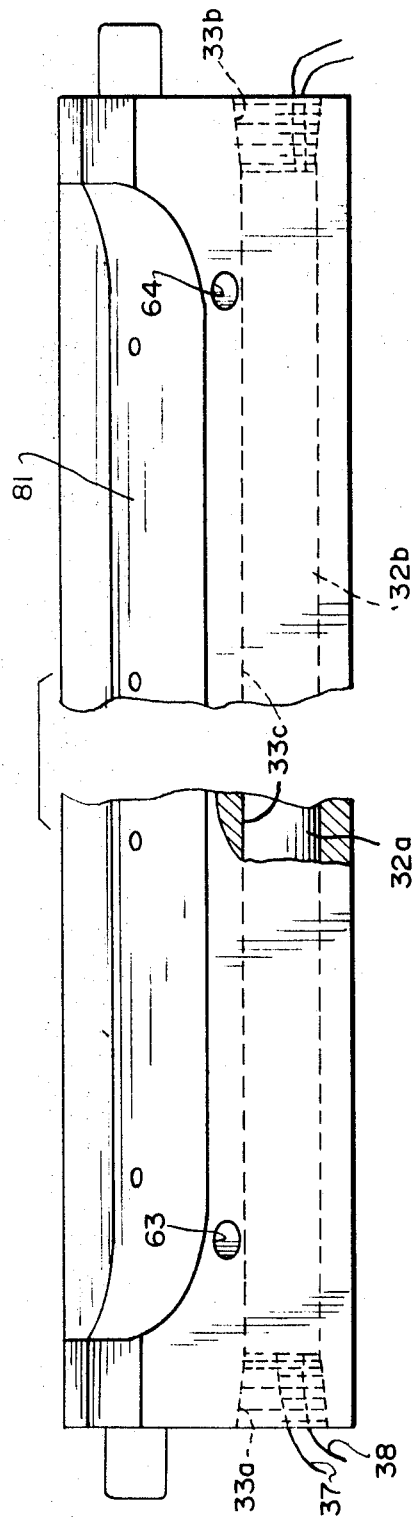
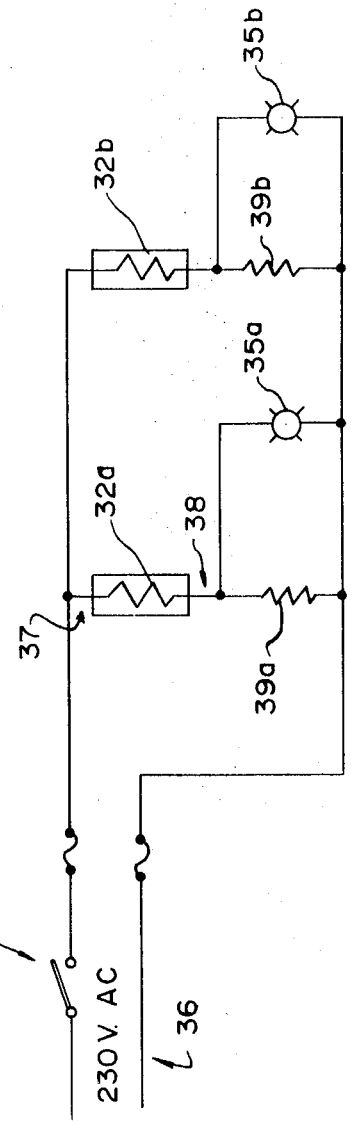

MACHINE FOR SKINNING BACON BELLIES

BACKGROUND OF THE INVENTION

1. Field of the Invention

The field of this invention is that of a method and machine for separating the skin from a bacon belly by a combined cutting and melting action. The field of the invention is also that of a bacon skinning machine having a heated knife blade wherein the skin is separated from a bacon belly by a combined cutting and melting action of the heated knife blade.

2. Description of the Prior Art

Prior art bacon skinning devices or machines have long utilized a knife edge for separating or cutting the skin of a so-called "green bacon belly" from the bacon meat (fat and tissue). It has also been shown in the prior art to use an implement having a heated beveled edge for melting the bacon meat adjacent the skin to separate the skin from the bacon meat as described in the Derby U.S. Pat. No. 2,654,122. In this prior art process the skin is pulled away from the bacon belly as the heated beveled edge melts the fat in the area adjacent to the skin. This process is somewhat inefficient since it is slow and an appreciable amount of fat is left on the skin.

On the other hand, the bacon skinning method utilizing a knife edge retained in a pressure shoe wherein the bacon belly is fed past the cutting edge of the knife blade has been fairly effective in separating the bacon meat from the skin. However, with today's emphasis on maximum productivity the meat packing industry is becoming more concerned about the amount of bacon meat (fat and tissue), particularly the fat, remaining attached to the skin after the skin is separated from the bacon belly in a conventional skinning machine. Furthermore, the fat left on the skin is of lesser value and must be removed from the skin before the skin can be further processed.

Therefore, it is not only important to increase the amount of fat separated from the skin during the skinning operation to increase the yield of bacon meat from the bacon belly but also to reduce the amount of trimming of the skin for further processing of the skin.

SUMMARY OF THE INVENTION

In order to take less fat with the skin of a bacon belly when skinning the bacon belly this invention provides a method for separating fat from the skin of a green bacon belly by a combined cutting and melting action. Preferably, the method also includes the prior step of accurately adjusting the distance which the cutting edge of the knife blade extends into the path of the bacon belly, the distance chosen being dependent upon the weight range and previous processing of the bellies being skinned. To carry out this method the invention also provides a bacon skinning machine comprising a knife blade retained in the machine and heating means associated with the knife blade for heating the knife blade so that the skin is separated from each bacon belly by a combined cutting and melting action thereby reducing the amount of bacon meat, i.e., fat, removed with the skin. Preferably, the machine also includes a pressure shoe for retaining the knife blade and means for accurately adjusting the distance which the knife blade extends from the pressure shoe.

BRIEF DESCRIPTION OF THE DRAWING,

FIG. 1 is a perspective view of a conventional bacon skinning machine on which the present invention may be incorporated and practiced.

FIG. 2 is a fragmentary sectional view on an enlarged scale showing a bacon belly as it is about to be fed against the knife blade in a modified pressure shoe used in the bacon skinning machine of FIG. 1.

FIG. 3 is a similar view as FIG. 2 but showing the bacon belly as it is being fed through the skinning machine of FIG. 1.

FIG. 4 is a perspective fragmentary view of a preferred embodiment of the adjusting means of this invention secured to the back of the modified pressure shoe used in the skinning machine shown in FIG. 1.

FIG. 5 is a top view of the adjusting means shown in FIG. 4.

FIG. 6 is a side view of the adjusting means and pressure shoe shown in FIG. 4.

FIG. 7 is an enlarged top plan view of the modified pressure shoe shown in FIG. 4.

FIG. 8 is a schematic illustration of the electrical circuit for heating the pressure shoe shown in FIG. 7.

Referring to FIG. 1 a conventional bacon skinning machine is indicated at 10, e.g., a Townsend Bacon Skinner. The basic components of this skinning machine are: a feeding platform 12, a series of claw shoes 14, a toothed roll 16, an elongated pressure shoe 18 and a knife blade 20. A housing supporting these basic components is indicated at 22.

The cycle of operation of the bacon skinning machine starts with the claw shoes 14 in a raised position as shown in FIG. 2. The bacon belly 24, which can be a fresh bacon belly, a defrost bacon belly, a smoked bacon belly or fatback, is placed on the feeding platform 12 with the skin side down and then fed into the machine. The means for feeding the bacon belly into the skinning machine comprises the claw shoes 14 and the toothed roll 16. Preferably, in feeding the bacon belly 24 into the machine 10, the middle of the bacon belly 24 is raised slightly to allow the end of the bacon belly to be tilted down, to more easily allow the skin to start under the blade 20. To start the cycle the claw shoes 14 are rotated so as to feed the bacon belly 24 into the blade 20. The claw shoes 14 are spring loaded by the spring 25 to keep a constant pressure on the bacon belly 24 regardless of variation in thickness between different bacon bellies. The claw shoes 14 acting on the upper side of the bacon belly also tend to bend the end of the belly 24 downward so that the skin 26 is forced tightly against the teeth 27 of the toothed roll 16 as the skin 26 is fed under the blade 20.

As the skin 26 feeds under the blade 20 a curved surface portion 28 of the pressure shoe is brought into contact with the skin 26 so that the skin is removed from the entire bacon belly 24. After the skin 26 has been removed an operating mechanism (not shown) of known type within the bacon skinning machine 10 lifts all the claw shoes 14 vertically a small distance, long enough to allow the skinned slab of bacon meat 29 to be released and dropped out of the back of the machine. Then the claw shoes 14 are pivoted or rotated to their upper position as shown in FIG. 2 to repeat the cycle.

In a conventional bacon skinning machine the amount of bacon meat, i.e., fat and tissue, particularly fat, left on the skin is controlled by adjusting the position of the cutting edge of the blade 20 in the pressure shoe 18. For this purpose, two blade adjustment screws are provided in the pressure shoe 18 adjacent each end thereof. In a conventional machine the two screws are Allen screws.

We have discovered that the amount of fat left on the skin can be appreciably reduced by heating the knife blade 20. In other words, a more efficient way of separating the bacon meat 29 from the skin 26 is obtained by not only adjusting the position of the cutting edge of the blade 20, but also, by heating the blade 20 whereby the skin is separated from the bacon meat by a combined cutting and melting action.

In the illustrated embodiment, we provide two heating cartridges 32a and 32b (FIGS. 7 and 8) which are inserted respectively through bored ends 33a and 33b (FIG. 7) formed at each end of a modified pressure shoe 34 into a bore 33c extending longitudinally through the pressure shoe 34, for heating the pressure shoe 34 and thereby the knife blade 20. Preferably, the heating cartridges 32a and 32b extend to approximately the middle of the pressure shoe 34. In the illustrated embodiment, each heating cartridge 32a and 32b is in the form of an electric heating element. Each cartridge 32a and 32b is connected in series with a pilot light 35a and 35b (shown schematically in FIG. 8) by wire conductors, such as wire conductors 37 and 38 connected to element 32a (FIGS. 7 and 8). Preferably, a resistor 39a (or 39b) is connected in parallel with each pilot light 35a or 35b (such as a 0.5 ohm 25 watt resistor). Each series combination of cartridge 32a (or 32b) and pilot light 35a (or 35b) is then connected to a source of electric energy 36, as shown schematically in FIG. 8. In one embodiment of the invention utilizing a pressure shoe approximately 19 inches long, each heating cartridge 32a and 32b is a 6 inch long, 1,000 watt heating element (such as a Watlow Fire-Rod Cartridge Heater 0L6A18 6inches LG. 1,000 watt 230 v. ) so that the two cartridges 32a and 32b fill most of the bore 33c.

We have found that the ideal temperature for the knife blade 20 is within the temperature range from 140 F. to 180 F. To maintain this temperature of the knife blade 20 within this range, where melting of the meat takes place without browning as the bacon belly passes through the machine, we provide temperature control means 40.

Preferably, the temperature control means 40 is in the form of a thermostatic sensing bulb (such as a Chromalox 0AR 2529 Thermostat Range 50°–250° F. 26 amps at 230 v.) secured to the pressure shoe 34 by means of a clamp member 42. The thermostatic sensing bulb 40 includes electrical contacts, as shown in FIG. 8, which, in the illustrated embodiment, are connected in series with the electric heating elements 32a and 32b. The contacts are adjusted so that they will open to stop the flow of electric energy to the heating cartridges 32a and 32b when the temperature of the pressure shoe reaches a first predetermined temperature and will close when the pressure shoe cools to a second predetermined temperature. In this way, the temperature of the knife blade 20 can be maintained at a reasonably constant temperature.

As shown in FIG. 8, each heating element 32a and 32b is connected respectively in series with a pilot light 35a or 35b. Each series combination of heating element 32a and 32b and pilot light 35a or 35b is then connected (in parallel) across the source of electric energy 36 which is preferably a 230 volt AC source. If one element 32a or 32b fails to operate, the series connected pilot light 35a or 35b will fail to light up indicating a malfunction in the circuit. Preferably, the pilot lights 35a and 35b are mounted on the outside of housing 22 in such a manner as to be easily and readily observed by the operator of the machine. Thus, if one heating element fails, the operator will be made aware of this failure by the failure of the associated series connected pilot light 35a or 35b to light up. This is important for two reasons:
1. Even though the temperature control means 40 is calling for heat the other heating element still functioning has insufficient capacity to heat the modified pressure shoe 34 by itself. Continued operation under these conditions will cause overheating and eventual failure of the other heating element.
2. It is difficult to visually determine the yield of bacon meat to determine if the heating elements 32a and 32b are functioning properly and adequately heating the knife blade 20.

In the conventional machine described above, the distance which the cutting edge of the knife blade 20 extends from the pressure shoe 18 is adjusted subjectively, i.e., by eyesight. This type of adjustment is somewhat coarse. Also, it is very difficult to adjust both Allen screws so that the cutting edge extends the same distance from the pressure shoe 18 along the entire length thereof. In view of this inability in a conventional machine to accurately adjust the distance which the cutting edge of the blade extends from the pressure shoe along the entire length thereof, we have developed an accurate means 44, as shown in FIGS. 2–6, for adjusting the distance which the cutting edge 43 of the knife blade 20 extends from the pressure shoe 34 along the entire length thereof.

The principal components of the adjusting means 44 are an adjustment bar 45, an adjusting screw 46 and adjusting pins 47 and 48. The adjustment screw 46 has a knob 50 at one end for turning the screw 46. The knob 50 is preferably knurled as indicated at 51. Between the knob 50 and the threaded portion 53 of screw 46 is a shaft portion 55 of larger diameter than the threaded portion 53. The bar 45 has a bearing mounting member 56 secured thereto approximately midway between the ends 57 and 58 of bar 45. A bearing 61 is press fitted into member 56 and bar 45. Shaft portion 55 is slidably and rotatably received within the bearing 61.

The pins 47 and 48 are secured respectively adjacent ends 57 and 58 of bar 45 and extend therefrom in the same direction as screw 46. The pins are sized to fit into bores 63 and 64 in the modified pressure shoe 34 which bores were threaded in the conventional machine to receive the Allen screws as described above and as shown in FIG. 7. Each pin 63 and 64 has a reduced in diameter portion 67, 68 the diameters of which are equal to the thickness of knife blade 20 whereby the end portions are slidably received into the bottom 69 of slot 70 in pressure shoe 34. Knife blade 20 is inserted into the open end 71 of slot 70.

The threaded portion 53 of screw 46 is received in a bore (not shown) formed partially in pressure shoe 34 and partially in spacer 73 secured to the pressure shoe 34. A locking nut 74 is disposed on the threaded portion 53 between spacer 73 and bar 45. When the adjusting means 44 is mounted on the pressure shoe 34, pins 47 and 48 are received in bores 63 and 64 with screw 46 threaded in the bore in spacer 73 and pressure shoe 34. The end portions 67 and 68 will then engage the bottom edge 75 of knife blade 20. By turning knob 50 in or out one is able to accurately adjust the distance which the cutting edge 43 of knife blade 20 extends from the open end 71 of slot 70 is pressure shoe 34 along the entire length of pressure shoe 34.

Batches of bacon bellies having different average weights and different process preparations require a different blade setting in order to obtain the maximum yield of bacon meat from each belly when it is fed through the improved bacon skinning machine of this invention. Therefore, the knife blades setting is adjusted for each batch of bellies to be skinned dependent upon the weight range and processing of the bellies to be skinned. Once a knife setting is made for a particular batch of bellies it is maintained for that batch by tightening locking nut 74 against spacer 73.

To facilitate passage of the skinned slab of bacon meat past the modified pressure shoe 34 and out of the back of the machine we provide a deflector means 79. The deflector means 79 includes a deflector plate 80 (shown by broken lines in FIG. 4) which is secured to the back top portion 81 of pressure shoe 34. The plate 80 is preferably mounted on a hinge so that the plate 80 can be lifted out of the way for adjusting the knob 50. In the embodiment shown, plate 80 is secured to one end 82 of a long hinge 83 by spot welds or other suitable attachment means. The other end 84 of the hinge 83 is secured to the back top portion 81 by means of screws 85 (only one of which is shown in FIG. 6). Deflector plate 8 extends rearwardly over adjusting means 44 and prevents the slabs of bacon meat passing through the machine from catching on, or becoming entangled with the parts, e.g., bar 45, of the adjusting means 44 as each slab of bacon meat passes out of the back of the machine.

In carrying out the method of this invention for separating the skin 26 from the bacon meat 29 the bacon belly 24, the bacon belly 24 is fed into the cutting edge 43 of the knife blade 20 while the knife blade 20 is simultaneously heated by the heating means 32a and 32b whereby the bacon meat 29 is separated from the skin 26 by a combined cutting and melting action. Preferably, prior to feeding the bellies through the machine, the distance from the cutting edge 43 of the knife blade 20 to the open end 71 of slot 70 in pressure shoe 34 is measured. Then this distance is accurately set at a certain dimension dependent upon the weight range and processing of the bellies being skinned. We have found that this method reduces the amount of fat removed with the skin 26. In comparative tests where approximately equal amounts of similar bacon bellies were fed through a skinning machine which was heated and through one which was unheated, a slightly greater percentage or yield of bacon meat was obtained from the bacon bellies utilizing the combined cutting and heating action that was obtained by merely utilizing a cutting action only. In other words, a higher yield of bacon meat is obtained by skinning bacon bellies with the method and apparatus of this invention. Also, the amount of fat left on the skin separated by the combined cutting and melting action was approximately 50 percent less than the amount of meat left on the skin separated by a cutting action alone.

A further advantage which may be obtained with this invention is that, in some instances, the cutting edge 43 of the knife blade 20 does not need to be sharpened as many times as it does when unheated.

We claim:

1. In a bacon skinning machine wherein bacon bellies are fed past a knife blade stationarily mounted in a pressure shoe which includes adjustment means for accurately adjusting the distance which the cutting edge of said knife blade extends from said pressure shoe along the entire length thereof, and electric heating means associated with said pressure shoe for heating said knife blade retained therein, the improvement comprising temperature sensing and control means secured to said pressure shoe for monitoring the temperature of said pressure shoe and for controlling the heat input to said pressure shoe to maintain the temperature of said knife blade within a predetermined temperature range between 140° F. and 180° F. to ensure melting of the bacon fat immediately adjacent the skin and to prevent browning of the bacon meat of each bacon belly when separating the skin from the bacon meat of each bacon belly with a combined cutting and melting action.